Patented July 14, 1925.

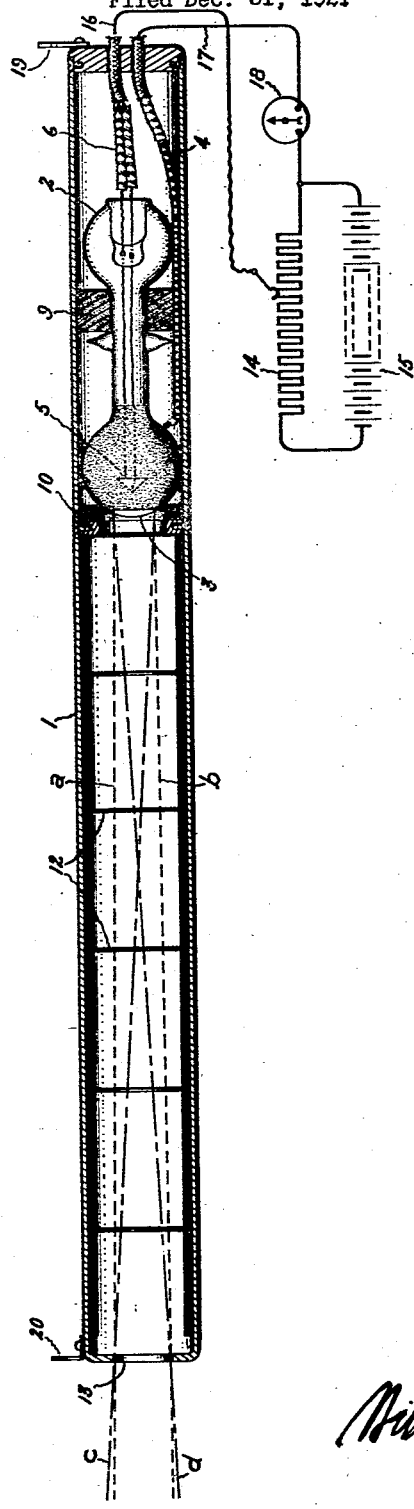

1,546,264

UNITED STATES PATENT OFFICE.

WILLIAM E. STORY, JR., OF SCHENECTADY, NEW YORK, ASSIGNOR TO GENERAL ELECTRIC COMPANY, A CORPORATION OF NEW YORK.

RADIATION-MEASURING DEVICE.

Application filed December 31, 1921. Serial No. 526,432.

*To all whom it may concern:*

Be it known that I, WILLIAM E. STORY, Jr., a citizen of the United States, residing at Schenectady, county of Schenectady, State of New York, have invented certain new and useful Improvements in Radiation-Measuring Devices, of which the following is a specification.

The present invention comprises a device adapted to the measurement of electromagnetic radiation having a wave length of the order of magnitude of light.

It is the object of my invention to provide for the direct measurement on a scale, of the actinic effect of radiation from a relatively small object located at a distance, while substantially excluding the effect of radiation from other sources.

The methods and devices heretofore used for indicating the actinic effect of radiation, for example, for photographic purposes, have depended either on the chemical effect of radiation on a sensitized medium in the general vicinity of the object to be photographed and oftener the general radiation condition near the camera; or they have depended on the visual effect of the radiation.

It is impossible by either of these methods to distinguish the condition of radiation from a particular object in the field of the camera. The chemical method is necessarily extremely inaccurate as the sensitized medium is affected by radiation coming from all directions and perhaps least of all by radiation from the field of the camera. The optical method is seriously handicapped by the fact that the apparent brightness of an object depends not only upon the intensity of radiation coming from it, as does the photographic plate, but also upon the level of illumination to which the eye is adapted, this level depending on the observer's surroundings and recent experience. Furthermore the ratio of the effects of two radiations of different wave lengths are in general not the same for the eye and the photographic emulsion.

It is frequently desirable, especially in motion picture photography, to secure a measurement of the actinic effect of the radiation from particular objects within the field of the camera; for example, in some cases parts of a set are photographed out of doors with natural illumination, while other parts of the same set are photographed in a studio with artificial illumination and it is desired to gauge the exposure of the film in such a way that the objects photographed out of doors may be pieced together with those photographed indoors without any apparent discrepancy in the density of the film. For this purpose the memory of the observer for quality and degree of illumination would be entirely undependable. Not only would the tendency of the eye toward enhancing a lower level of illumination by opening the iris make such a comparison impossible but a change in the general character of the background would alone often upset the judgment of the photographer.

By my present invention I have provided an instrument which will indicate in an absolute manner, namely, by deflection on a scale of an electrical instrument, the actinic effect of the radiation irrespective of the degree of illumination apparent to the eye of an observer and this instrument is adapted to measure the radiation from a limited area without being affected by the radiation from adjoining areas.

The accompanying drawing illustrates in longitudinal section one embodiment of my invention.

The apparatus illustrated comprises an elongated tube 1, consisting of brass or any other suitable material, and has one end open. Adjacent the opposite closed end of the tube is a photo-sensitive device 2, preferably having an electrode consisting of potassium or the like, capable of emitting electrons when illuminated, the electron emission varying with the actinic intensity of the radiation. The device 2 comprises a glass bulb coated on the inside with a conductive material, such as silver, upon which is deposited the potassium or other photo sensitive material constituting the cathode. A window 3 provides for the admission of radiation. Electrical contact is made to the photo-sensitive electrode by a conductor 4 and to the cooperating anode 5 by a conductor 6. The drawing shows a third conductor but this is used only during the manufacture of the coating and later may be connected to the conductor 6. These devices known as photo-electric cells do not by themselves constitute my present invention, and modifications of them will be found described in the scientific literature. The photo-electric cell is held in position by rings 9 and 10 consisting of rubber, or other suitable yielding material. The radiation can enter the window 3 only through the length of the tube 1, appreciable reflection from the side walls of the tube being prevented by diaphragms 12, which are perpendicular to the axis of the tube and have openings varying in size from the size of the open end of the tube to the size of the cell window according to their distance from the open end of the tube. The dotted lines a and b of the figure just pass through these openings. The inside surface of the tube 1 and the surface of the diaphragms are coated with a non-reflecting material.

The diameters of the window 3 and the opening 13 at the end of the tube will determine the maximum distance from which the radiation from any given area alone can be measured. For the proper determination of this radiation, no light coming from parts outside of the given area should reach the photo-electric device. Accordingly this maximum distance is such that the radiation area to be measured just fills the cone of which the opening 13 of the tube and the window 3 of the cell are two sections on opposite sides of the apex as indicated by dotted lines c, d in the drawing.

If it is desired to give equal weight to radiation from all parts of the given area when at its maximum distance as described above, then the opening 13 must be large as compared with the window 3. It is generally preferable, however, to use openings 13 and 3 of nearly the same size in order to obtain the greatest sensitivity for a given cone angle, and then move nearer the object under examination.

When it is desired to use the apparatus, the sensitivity is first preferably checked by placing a small lamp (not shown), operated at a suitable constant illumination, immediately in front of the opening 13, and then adjusting the potential across the electrodes of the cell, by means of the potentiometer 14 and the battery 15 connected as shown by the conductors 16, 17 to the cell, until the galvanometer 18 shows a unit deflection. When the device is used the radiation from each object or area is then compared with the constant illumination as a unit. The device may be aimed during use by suitable sights 19, 20 similar to the peep sights of a shot gun.

Devices other than the potassium cell may be used in this apparatus, for example, a device containing caesium, rubidium, calcium or other light sensitive materials of this class may be used. These different devices will not in general be proportionally sensitive to radiation from different parts of the spectrum. In this way by the proper selection of such materials or by their blending on juxtaposition in the proper proportions or layers or areas, the device may be used for indicating radiation of different wave length in any proportion desired over a wide range. This will be useful in photometry, color photography, X-rays, ultraviolet radiations and similar applications.

What I claim as new and desire to secure by Letters Patent of the United States, is:

1. A device for indicating the actinic effect of radiation from a given area at a distance which comprises an elongated tube of substantially uniform diameter throughout its entire length, an electric device sensitive to electromagnetic radiation, supported within said tube means for indicating a change of electric condition of said device and means for transmitting to said device radiation from said area while excluding radiation from other sources.

2. An apparatus for indicating the actinic effect of radiation from a given area at a distance which comprises an elongated tube of substantially uniform diameter throughout its entire length and having one end open, a photo-electric cell having an electrode sensitive to radiation located to receive radiation from a given source through said tube while excluding extraneous radiation, and means for indicating the effect of said radiation on said cell.

3. An apparatus for indicating the actinic effect of radiation from a given area at a distance which comprises a tube having one end open, a potassium cell having a window arranged to receive radiation through said tube, baffle plates in said tube excluding radiation from other sources, a source of potential connected to said cell, and an electrical indicating instrument connected in circuit with said source.

4. A portable device for indicating the actinic effect of radiation from a given area at a distance, which comprises a tube having one end open, a sighting device mounted on said tube, and electrical means sensitive to electromagnetic radiation rigidly supported within said tube.

5. A device for indicating the actinic effect of radiation from a given area at a distance, which comprises an electric device sensitive to electromagnetic radiation, an indicator connected to said device, means for impressing a potential on said electric device, said means including a potentiometer connected to said indicator and to said electric device.

In witness whereof, I have hereunto set my hand this 30th day of December 1921.

WILLIAM E. STORY, Jr.